United States Patent Office 3,382,220
Patented May 7, 1968

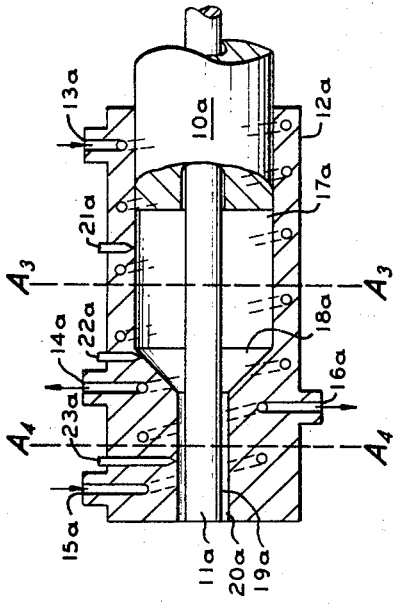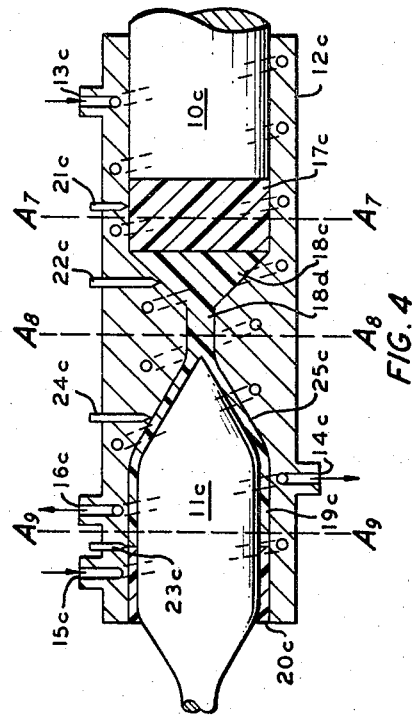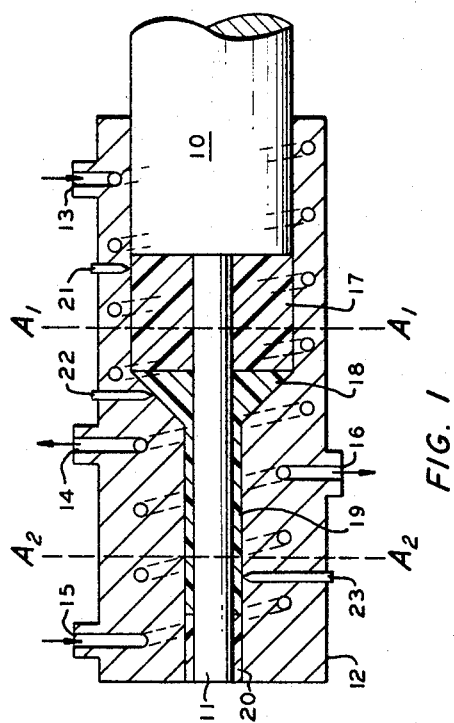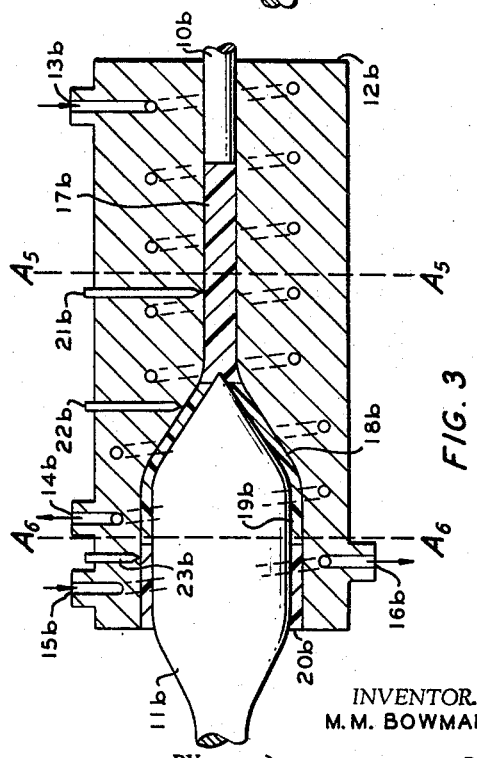

3,382,220
TRANSPARENT LINEAR POLYMERS
Mark M. Bowman, Jr., Bartlesville, Okla., assignor to Phillips Petroleum Company, a corporation of Delaware
Filed Feb. 3, 1964, Ser. No. 341,903
5 Claims. (Cl. 260—88.2)

ABSTRACT OF THE DISCLOSURE

Oriented, transparent, self-supporting tubing is produced by extruding a linear polymer at about the atmospheric crystalline melt point of the polymer.

---

This invention relates to transparent linear polymers and to means and methods for their production. In one aspect this invention relates to the extrusion of linear polymers that are transparent and oriented with a resulting increase in their density and tensile strength properties.

It is known to extrude linear polymers, e.g., solid polymers of alpha olefins (1-olefins) in the form of tubes or sheets with a controlled degree of orientation to increase tensile strength and to improve other properties of the polymers. Transparent film of oriented and non-oriented linear polymers have been produced. Highly oriented polymers have been produced by stretching or extending the polymer at temperatures up to the crystalline freeze point of the polymer; however, polymers oriented in this manner are relatively unstable and usually shrink to their pre-stressed form when heated.

It is an object of this invention to provide oriented linear polymer articles that are transparent and relatively thermally stable. Another object of this invention is to provide a method and means for extruding transparent articles of linear polymers such as solid polymers of ethylene and propylene and copolymers of ethylene or propylene with a higher molecular weight 1-olefin polymer. Still another object of this invention is to provide a method and means for producing uniaxially oriented and biaxially oriented transparent linear polymer articles. Other objects and advantages will be apparent to those skilled in this art upon study of the present disclosure including a detailed description of the invention and the appended drawing wherein:

FIGURE 1 is a cross-sectional elevation of a device for producing uniaxially, longitudinally oriented transparent linear polymer tubes;

FIGURE 2 is a modification of the device of FIGURE 1;

FIGURE 3 is a cross-sectional elevation of a device for producing uniaxially, circumferentially oriented transparent linear polymer tubes; and FIGURE 4 is a cross-sectional elevation of a device for producing biaxially oriented transparent linear polymer tubes.

I have discovered that solid linear polymers such as polymers of alpha olefins (1-olefins) can be extruded into highly oriented transparent tubes, sheets and other forms under certain conditions of temperature and pressure. The highly oriented, transparent articles are produced when a linear polymer is extruded from a consolidated mass through a die opening such that the polymer is caused to change its direction of flow while in the pressure-induced crystalline state at a temperature above its atmospheric crystalline freeze point and its new direction or form is then maintained until the polymer is cooled to a temperature below its atmospheric pressure crystalline melt point. Linear polymers such as 1-olefin polymers are compressible in the molten state. Compression is a driving force in the direction of crystallization and therefore crystallization can be induced in such polymers at temperatures above their normal or atmospheric pressure crystallization temperatures by application thereto of compression. I have found that transparent linear polymer articles are produced when these articles are formed under orienting conditions at a temperature above the crystalline freeze point of the polymer but not substantially higher than the atmospheric pressure crystalline melt point of the polymer under conditions of pressure sufficient to cause pressure-induced crystallization at the forming temperature. Such articles are oriented as a result of the forming pressure applied to the polymer in the pressure-induced crystalline state. The density of the transparent articles is increased over that of articles formed by conventional processes.

In forming transparent tubes according to the practice of the invention, the tubes can be uniaxially oriented longitudinally or circumferentially or the tubes can be biaxially oriented, i.e., longitudinally and circumferentially. Orientation of the polymer occurs in the direction of flow of polymer as a result of forces applied to the polymer sufficient to induce crystallinity of the polymer while at a temperature above the atmospheric pressure crystalline freeze point but not substantially above the atmospheric pressure crystalline melt point of the polymer. Thus, longitudinal orientation is obtained by decreasing the wall thickness of the tube by lengthening the tube and circumferential orientation is obtained by decreasing the wall thickness by increasing the diameter of the tube.

The relationship between transparency of polymer and orientation of polymer is not fully understood; however, it is believed that transparency results from orientation of polymer while in a state of pressure-induced crystallinity and then maintaining the polymer at a temperature below the crystalline melt point at the existing pressure. Cooling the polymer to below its crystalline melt point while still in the forming die nozzles produces sufficient back pressure on the extrusion process to provide the crystal-inducing pressure at the critical orientation-producing area of the extrusion die. The critical temperature gradient through the extrusion equipment can be obtained by electrical heating or by fluid heat exchange coils strategically positioned on the extrusion equipment with the temperature at the critical areas being detected by thermocouples or other temperature-sensitive devices. If the molding or extrusion operation is conducted on a polymer melt at a temperature above the atmospheric pressure freezing point but below the atmospheric pressure melting point at a pressure sufficient to cause pressure-induced crystallinity, it is not necessary to cool the polymer further because the polymer will not lose its crystallinity until its temperature is again raised to the crystalline melt point at the existing pressure.

The pressure-induced crystallization of a linear polymer melt is believed to produce a physical state of polymer which can best be described as polymer crystals dispersed in a matrix of amorphous polymer (about 30–35 percent amorphous polymer) which allows orientation of the crystals with a relatively small amount of resultant strain on the oriented polymer crystals. This phenomenon is believed evidenced by observations that articles made by the practice of the invention are reasonably thermally stable.

Orientation of polymers can be obtained by compression, as in the present case, or by tension, e.g., by stretching or extending the extruded article. Pressure induced crystallization is not applicable to orientation by tension. The orientation pattern or type obtained by compression orientation is believed to be different from that obtained by tension orientation. Although the differences have not been fully determined or evaluated it is believed that the transparent resin articles produced by the practice of the present invention are, at least in part, a result of compression orientation of the resin while in a state of pressure induced crystallization. It is also believed that the improved thermal stability of the compression oriented articles is due, at least in part, to compression orientation while in a state of pressure induced crystallization.

The crystalline freezing point should not be confused with the crystalline melting point which is considerably higher and also the crystalline freezing point should not be confused with the softening temperature which is a measure of the temperature which causes a measured distortion under the test load. Linear polymers exhibit a characteristic curve upon cooling which is somewhat different from the curve obtained on heating. The crystalline freezing point is taken as the midpoint of the plateau in the cooling curve and the extremities of the plateau are taken as the upper and lower limits of the freezing point. Determination of the crystalline freezing point is accomplished by observing the temperature of a cooling polymer melt at regular time intervals from 300° F. to 100° F. and plotting temperature versus time. Approximately 65 percent of the crystallinity of polyethylene forms at the crystalline freezing point of 252±2° F. The polymer continues to increase in crystallinity as it is cooled below the crystalline freezing point until it reaches room temperature and a total crystallinity of about 93 percent. Pressure-induced crystallinity at a temperature above the atmospheric pressure crystalline freezing point induces a somewhat different result in that the material changes from its amorphous state to a highly crystalline state within a relatively short temperature change so that the material becomes crystalline rather suddenly under the effects of applied pressure.

The crystalline melting point is determined by a method described by L. Cofler and A. Cofler in "Micro-Methoden zur Kennzeichnung Organischer Stoffe und Stoffgemische," Univ. Wagner, Innsbruck, 1948. The method comprises the use of a polarizing microscope having a heating stage for heating films of polymer. The crystalline melting point is recorded as the temperature at which birefringence disappears.

Density, melt index and ultimate tensile strength are determined by recognized ASTM methods.

Properties of representative linear polymers determined at atmospheric pressure are shown in the following Table I:

The polymers should have a crystallinity of at least about 85 percent as determined by the method described in "Crystallinity of Polyethylene by X-Ray Diffractometry" by R. H. H. Pierce, Jr., J. Holmes, F. C. Wilson and W. M. D. Bryant, available at the Wilmington Institute Free Library in Wilmington, Del.

of the mold is heated to about the atmospheric pressure crystalline melting point of the polymer or slightly above. The area of the mold below the frusto conical section 18, indicated as 19, is cooled progressively to a temperature below the atmospheric pressure crystalline melt point of the polymer at the die opening 20. The temperature of zones 17, 18, and 19 can be determined by thermometers or thermocouples in thermowells 21, 22, and 23.

The degree of orientation of the extruded polymer pipe will be determined by the ratio of the cross-sectional area $A_1$ to the cross-sectional area $A_2$.

The device of FIGURE 2 is substantially the same as that of FIGURE 1 except that the plunger or mandrel 11a of FIGURE 2 is stationary with respect to piston 10a so that the piston forces the plastic material through the annular die opening 19a and the mandrel 11a remains stationary. This modification of the device is particularly applicable to producing continuous tubing. Linearly oriented tubing is produced in both of the devices of FIGURES 1 and 2.

The device of FIGURE 3 produces circumferentially oriented polymer pipe because the polymer in the cavity 17b is formed into a tube of increasing diameter in the zone 18b wherein pressure induced crystallinity occurs.

Polymer tubing or pipe that is biaxially oriented is produced in the device of FIGURE 4 wherein the molten plastic material in a state of pressure induced crystallinity is first decreased in its cross-sectional area in zone 18c and in zone 18d to form a linearly oriented rod. The linearly oriented rod of thermoplastic material is then formed into a tube of increasing diameter in zone 25c so that circumferential orientation is imparted to the tube and the biaxially oriented tube passes out of the die opening 20c at a temperature below the atmospheric pressure crystalline melt point of the polymer.

The temperature gradient of the polymer in the extrusion process can be determined and controlled by means of appropriate temperature sensing devices in the thermowells 21, 20, and 23 positioned adjacent the areas of critical temperature in the devices of FIGURE 1 and the corresponding thermowells of FIGURES 2, 3, and 4. An additional thermowell 24c is indicated in FIGURE 4 because of the additional orienting step in the devices of FIGURE 4. Heating can be done by heat exchange tubes as indicated in the drawing or by the use of electrical heaters in the form of a resistance wire wrapped around the mold or by bayonet type heaters which penetrate the walls of the mold. Temperature control can be accomplished manually by observing the temperature at the various points and controlling the amount of heating and

TABLE I.—POLYMER PROPERTIES AT ATMOSPHERIC PRESSURE

| | Crystalline Melting Point, °F. | Crystalline Freezing Point, °F. | ASTM D 1505-57T Density, gm./cc. | ASTM D 1238-52T Melt Index, gm./10 min. | ASTM D 412-51T Ultimate Tensile Strength |
|---|---|---|---|---|---|
| Polyethylene | 276 | 253 | 0.960 | 0.2 | 4,400 |
| Ethylene, 1-butene copolymer | 268 | 252 | 0.950 | 0.3 | 3,800 |
| Polypropylene | 329-336 | 254-262 | 0.90-0.91 | 2.5-6.0 | 4,200-4,700 |

Referring now to the drawing and particularly to FIGURE 1, an extrusion device comprising a piston 10 having attached thereto a plunger 11 is positioned in a mold 12. Plunger 11 is the mandrel over which the pipe is formed. A heating medium is introduced at inlet 13 and is withdrawn at outlet 14. A cooling medium is introduced at inlet 15 and withdrawn at outlet 16. A cylinder of consolidated plastic material is placed in the enlarged portion of the mold cavity 17 and the piston 10 is introduced into the mold cavity with the plunger 11 extending through the center opening of the plastic cylinder and the mold is heated so that the polymer in the cavity 17 is heated to above the atmospheric pressure crystalline melting point of the polymer and the frusto conical section 18 cooling or these steps can be controlled automatically by conventional temperature sensing and temperature control instruments.

Forced cooling will not be necessary if the forming operation is done at a temperature below the atmospheric pressure crystalline melting point of the resin or if heat loss from the equipment is sufficient to reduce the temperature of the resin to below the atmospheric pressure melting point before the pressure on the formed resin is released. If the forming operation is to be performed at a temperature below the atmospheric pressure melting point the polymer or resin should be melted, i.e., raised to a temperature above its atmospheric pressure melting point and then cooled to the desired forming temperature before the forming pressure (crystal inducing pressure) is applied. In any event the resin should be melted before the pressure is applied.

The change of direction of hatch lines of the polymer in the drawing is intended to indicate changes in state of the polymer. The polymer in zone 17, for example, can be a melt at a temperature above the crystalline freeze point at the applied pressure. The polymer in zone 18 is at a temperature below the crystalline freeze point of the polymer at the applied pressure. The polymer in zone 19 can be cooled, if desired, to a temperature below the atmospheric pressure crystalline freeze point of the polymer prior to exiting the outlet 20.

The following specific examples may be helpful in attaining an understanding of a mode of practicing the invention but should be considered as illustrative and not as unduly limiting the invention.

EXAMPLES

Perforated cylinders or "doughnuts" of consolidated polymer were used in the following runs. The polymer or resin was a copolymer of ethylene and 1-butene having 2–3 mol percent 1-butene incorporation. Pertinent properties of the copolymer are given in Table I. Tubes of the resin were formed in a mold as shown in FIGURE 1. The diameter of $A_1$ or zone 17 was 1.25 inches; the diameter of $A_2$ or zone 19 was 0.85 inch; and the diameter of mandrel 11 was 0.75 inch. Therefore the ratio of the cross-sectional area of the resin in zone 17 to the cross-sectional area of the resin in zone 19 is about 7 to 1. This can be considered a measure of the compression orientation of the resin in a pipe or tube extruded from the mold.

A doughnut of the ethylene/1-butene resin as described was placed in the mold and heated to 272° F. and extruded at 3,000 p.s.i. The mold was not cooled. Heat loss was sufficient to reduce the temperature of the extrudate to below the atmospheric pressure melting point of 268° F. or to about 260° F. The tube was transparent, had a density of 0.956 gm./cc., and a longitudinal ultimate tensile strength of 12,200 p.s.i.

A similar run was made at a temperature of 268° F. and a pressure of 3,000 p.s.i.

A transparent tube with a longitudinal ultimate tensile strength of 11,300 p.s.i. was obtained.

Another run at 276° F., with other conditions the same as in previous runs produced a tube that was pearly or milky but not transparent.

Transparent tubes were produced at a temperature as low as 258° F. and a pressure of 3,000 p.s.i. from polymer melts.

Tubes as formed in these runs display excellent properties for the fabrication of shotgun shells, bottles and other articles where clarity and high tensile strength are indicated.

Reasonable variations and modifications are possible within the scope of this disclosure without departing from the spirit and scope of the invention.

That which is claimed is:

1. The method of forming oriented transparent, self-supporting, tubing which comprises extruding a linear polymer from an extrusion chamber through an elongated annular die opening of smaller cross-sectional area than that of said extrusion chamber at a temperature above the atmospheric crystalline freeze point but not substantially above the atmospheric crystalline melt point of the polymer and at an extrusion pressure sufficient to maintain the polymer in the pressure induced crystalline state; and cooling the extruded tube to a temperature below the atmospheric pressure crystalline melt point of the polymer while in the elongated die opening.

2. The method of forming transparent, self-supporting, seamless, oriented tubing which comprises extruding a linear polymer having crystallinity of at least about 85 percent from an extrusion chamber through an elongated, annular die opening of smaller cross-sectional area than that of said extrusion chamber and a ratio of extrusion chamber diameter to annular die opening diameter sufficient to impart a predetermined degree of orientation to the extruded tube, at a temperature in the range of about 5° F. above and about 13° F. below the atmospheric pressure crystalline melt point of the polymer; at a pressure sufficient to maintain the polymer in the extrusion chamber and in the annular die opening in a state of pressure induced crystallinity; and cooling the extruded tube while in the annular die opening to a temperature below the atmospheric pressure crystalline melt point of the polymer.

3. A method of forming transparent, seamless, self-supporting, tubing uniaxially oriented in the longitudinal direction, from a solid copolymer of ethylene and 1-butene having a 2–3 weight percent 1-butene incorporation and having a density of 0.950, melt index of 0.3, and crystallinity of 87–88 percent which comprises extruding said copolymer from an extrusion chamber through an elongated, substantially straight annular die opening of smaller cross-sectional area than that of said extrusion chamber at a temperature in the range of about 258° F. to about 273° F.; at a pressure of about 3,000 p.s.i.; and cooling said copolymer while in the annular die opening to a temperature below 268° F.

4. The method of forming transparent, oriented, solid articles which comprises extruding a linear polymer from a consolidated mass through an elongated die nozzle so that the polymer is caused to change its direction of flow and to flow in the new direction of flow at a temperature above the atmospheric crystalline freeze point but not substantially above its atmospheric pressure crystalline melt point and at a pressure sufficient to induce crystallinity; and cooling the polymer in the die nozzle to a temperature below the atmospheric pressure crystalline melt point of the polymer before the pressure on the polymer is reduced.

5. The product formed by the method of claim 1.

References Cited

UNITED STATES PATENTS

| | | | |
|---|---|---|---|
| 2,961,711 | 11/1960 | Diedrich et al. | 18—84 |
| 2,825,721 | 3/1958 | Hogan et al. | 260—88.2 |
| 3,141,912 | 7/1964 | Goldman et al. | 260—94.9 |
| 3,212,136 | 10/1965 | Levett | 18—14 |
| 3,187,383 | 6/1965 | Bacchus et al. | 264—209 |
| 3,129,461 | 4/1964 | Zavanork et al. | 264—209 |

FOREIGN PATENTS 223,196  11/1957  Australia.

JOSEPH L. SCHOFER, *Primary Examiner.*

L. EDELMAN, *Assistant Examiner.*